F. F. BRADLEY.
OVEN.
APPLICATION FILED JUNE 12, 1916.
1,211,535.
Patented Jan. 9, 1917.
2 SHEETS—SHEET 1.
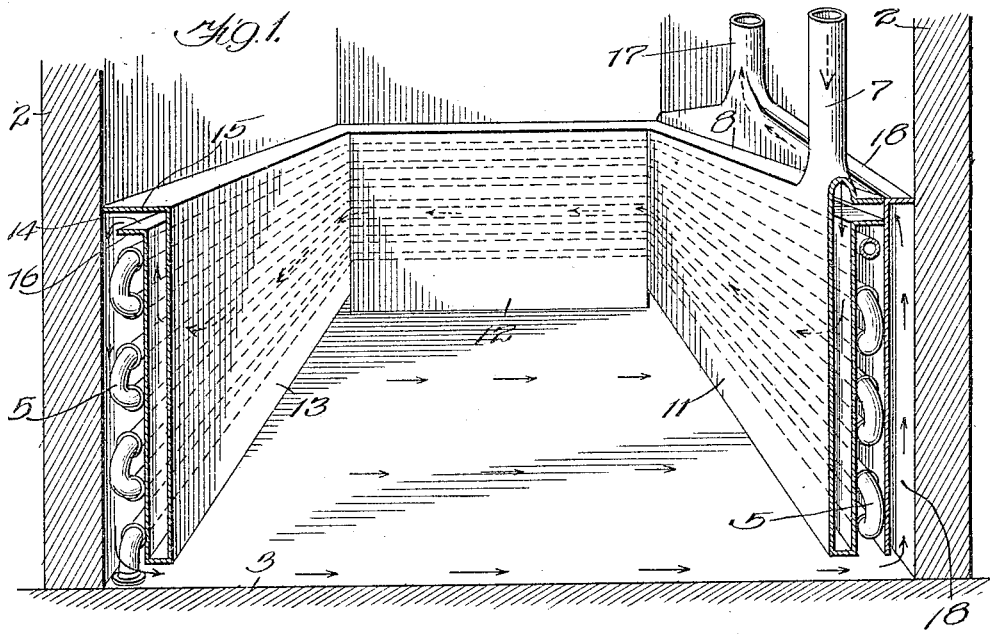
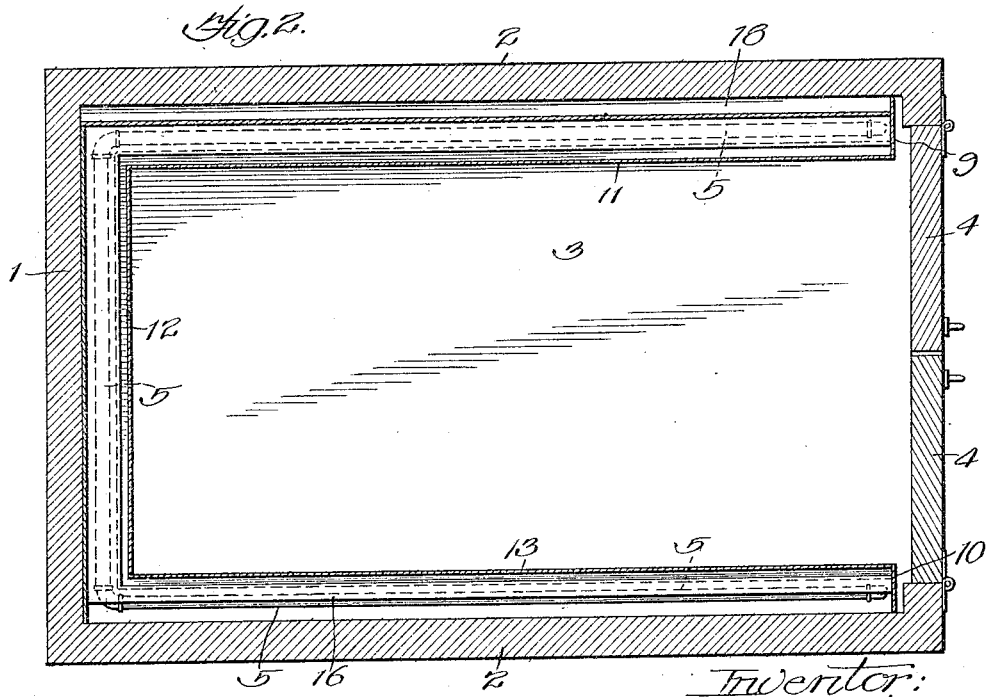
Inventor:
Franklin F. Bradley.

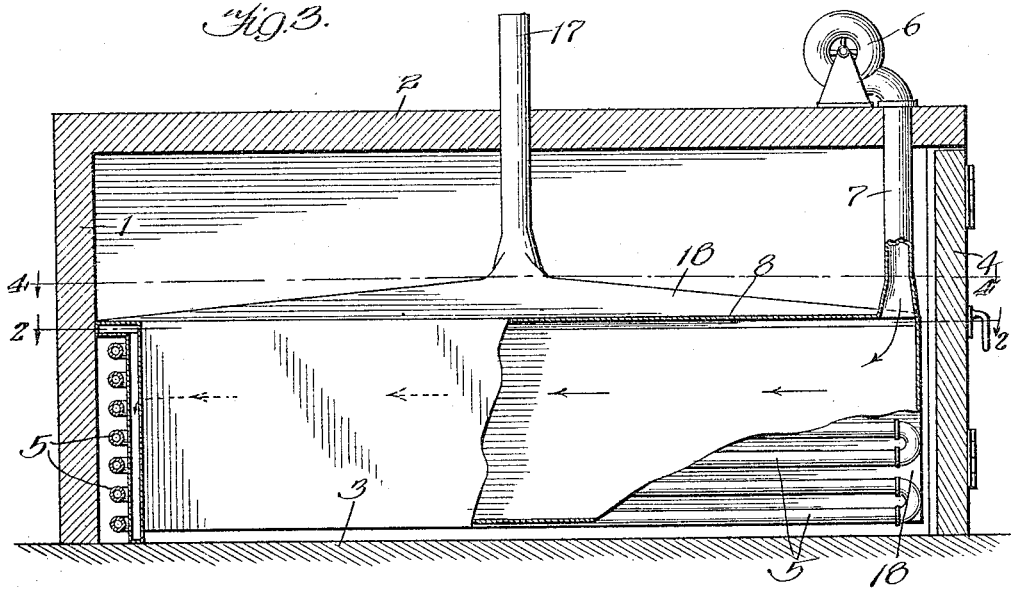
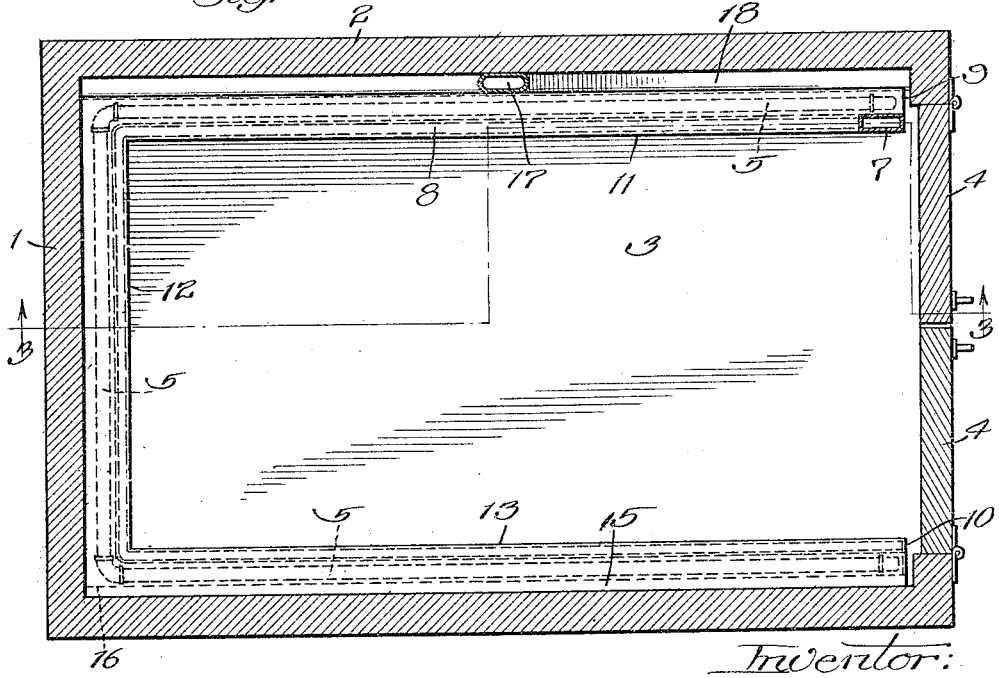

UNITED STATES PATENT OFFICE.

FRANKLIN F. BRADLEY, OF CHICAGO, ILLINOIS, ASSIGNOR TO BRADLEY & VROOMAN COMPANY, OF CHICAGO, ILLINOIS, A CORPORATION OF ILLINOIS.

OVEN.

1,211,535.     Specification of Letters Patent.     Patented Jan. 9, 1917.

Application filed June 12, 1916. Serial No. 103,297.

*To all whom it may concern:*

Be it known that I, FRANKLIN F. BRADLEY, citizen of the United States, residing at Chicago, in the county of Cook and State of Illinois, have invented a certain new and useful Improvement in Ovens, of which the following is a full, clear, concise, and exact description, reference being had to the accompanying drawings, forming a part of this specification.

My invention relates to ovens and has for its object the provision of improved means for heating and ventilating the same whereby the temperature therein may be made more uniform throughout.

In practising my invention an air circulating system is formed that will insure the passage of heated air from side to side of the oven close to its floor whereby this portion of the oven interior is raised to the desired temperature as well as other portions of the oven interior. I employ means for effecting the forced passage of air into and from the oven, the air in its passage through the oven being heated by some suitable heating means such as steam piping, the air after being heated being withdrawn from the oven and moving close to the oven floor in its exit. By this arrangement not only is the desired temperature maintained close to the floor of the oven but the gases, etc., within the oven are ejected from the oven.

I will explain my invention more fully by reference to the accompanying drawings showing the preferred embodiment thereof and in which—

Figure 1 is a perspective view illustrating a portion of the interior of an oven and part of the heating arrangement of my invention; Fig. 2 is a view on line 2 2 of Fig. 3; Fig. 3 is a view on line 3 3 of Fig. 4; and Fig. 4 is a view on line 4 4 of Fig. 3.

Like parts are indicated by similar characters of reference throughout the different figures.

The walls 1, ceiling 2, floor 3, and doors 4 may be formed of any suitable material to enable them to hold the heat when the oven doors are closed. The means for heating the air desirably resides in piping 5 arranged around the walls of the oven and serving to convey heating steam. The air is supplied from the exterior of the oven to the interior thereof by means of a blower 6 whose discharge nozzle is connected by means of piping 7 with an air conduit 8. This air conduit is desirably in the form of a flat high pipe closed at its ends by the walls 9 and 10. This air pipe or chamber is desirably formed with two portions 11, 12 respectively adjacent one side wall of the oven and the inner end wall thereof and a third portion 13 adjacent the remaining side wall of the oven. The heating chamber 11, 12, 13 is closed except for the communication with the exterior air afforded therefor by the pipe 7 and blower 6 and a discharge opening or slot 14 in the section 13 of the chamber, this opening 14 being desirably as long as the oven wall adjacent it and being preferably located at the top of the heating chamber section 13 so that the hottest air may have opportunity to escape from the heating chamber. The top plate 15 prevents the heated air from rising directly into the oven, this plate 15 constituting one wall of the slot or opening 14 and extending clear to the adjacent oven wall to seal the top of the heating chamber from direct communication with the oven interior. The plate 16 which constitutes the other wall of the slot or opening 14 does not extend clear to the adjacent oven wall whereby communication is afforded between the interior of the heating chamber section 13 and the space between this heating chamber section and the adjacent oven wall. Slight spaces intervene between the sections 11 and 13 of the heating chamber and the bottom of the oven, these spaces having communication with the spaces intervening between the heating chamber and the oven walls. The space beneath the chamber section 11 also has communication with the outlet flue 17, this outlet flue being desirably flattened and widened as indicated at 18 so as to be substantially equal in heating area and in capacity to the area and capacity of the adjacent chamber section 11 and also the chamber section 13. The inlet end of the flue 17 terminates slightly above the floor of the oven, desirably extending as close to this floor as do the chamber sections or portions 11 and 13.

By the arrangement described fresh air finds passage from the blower 6 and pipe 7 to one end of the air conveying chamber 11, 12, 13. The air is forced through this chamber from this end to its exit opening 14 at its other end, the air becoming sufficiently heated before it is discharged from the circulation chamber 11, 12, 13. After the air is forced downwardly from the exit opening 14 through the space behind the chamber section 13, it passes beneath the chamber section 13 and the chamber section 11, whence it flows to the discharge pipe or flue 17 by way of the flattened flue extension 18 that defines a space behind the chamber portion 11. The steam piping 5 is desirably separately boxed, it being preferred to locate this piping upon the exterior of the heating chamber for structural reasons, though it is to be understood that I do not limit myself to the location of the heating means nor to the employment of steam for the purpose of heating the air. It will be observed that the heated air must flow close to the bottom of the oven in order that it may find exit and in thus flowing it heats the oven interior adjacent the oven floor to substantially the temperature prevailing in the balance of the oven and maintains such temperature substantially uniform when the oven is closed. While the portions 11 and 13 of the heating chamber are desirably joined by an intervening chamber section 12 and while these portions 11 and 13 are desirably spaced apart by being located along parallel walls of the oven, I do not wish to be limited to this arrangement of the heating chamber.

The air discharged from the heating chamber finds entrance to the space behind the chamber section 13 at the top of this space and finds exit from the space behind chamber section 11 at the top of this latter space. The air flowing in the first of these spaces continues to be subject to the action of the portion of the heater 5 behind chamber portion 13, while the heated air flowing through the latter space coöperates with the portion of the heater 5 behind the chamber portion 11 to heat the air in this chamber portion.

While I have herein shown and particularly described the preferred embodiment of my invention I do not wish to be limited to the precise details of construction shown as changes may readily be made without departing from the spirit of my invention, but

Having thus described my invention I claim as new and desire to secure by Letters Patent the following:—

1. The combination with an oven; of an air conveying chamber therein located adjacent the oven floor and having two opposed portions with slight spaces between the same and the oven floor and behind which chamber portions there are air conveying spaces in communication with the aforesaid spaces and through these spaces with the oven interior, one of these chamber portions receiving air from the exterior of the oven while the other chamber portion has an exit opening in communication with the exterior of the oven by way of the space behind this chamber portion, the space between this chamber portion and the floor, the oven interior, the space between the other chamber portion and the floor, and the space behind this latter chamber portion and which latter space discharges upon the exterior of the oven; means for effecting the forced circulation of air through said chamber from and to the exterior of the oven; and means for heating the circulating air.

2. The combination with an oven; of an air conveying chamber therein located adjacent the oven floor and having two opposed portions with slight spaces between the same and the oven floor and behind which chamber portions there are air conveying spaces in communication with the aforesaid spaces and through these spaces with the oven interior, one of these chamber portions receiving air from the exterior of the oven while the other chamber portion has an exit opening in communication with the upper portion of the space behind it and with the exterior of the oven by way of the space behind this chamber portion, the space between this chamber portion and the floor, the oven interior, the space between the other chamber portion and the floor, and the space behind this latter chamber portion and which latter space discharges upon the exterior of the oven; means for effecting the forced circulation of air through said chamber from and to the exterior of the oven; and means for heating the circulating air.

3. The combination with an oven; of an air conveying chamber therein located adjacent the oven floor and having two opposed portions with slight spaces between the same and the oven floor and behind which chamber portions there are air conveying spaces in communication with the aforesaid spaces and through these spaces with the oven interior, one of these chamber portions receiving air from the exterior of the oven while the other chamber portion has an exit opening in communication with the exterior of the oven by way of the space behind this chamber portion, the space between this chamber portion and the floor, the oven interior, the space between the other chamber portion and the floor, and the space behind this latter chamber portion and which latter space discharges air at its upper portion from the oven; means for effecting the forced circulation of air through said chamber from and to the exterior of the oven; and means for heating the circulating air.

4. The combination with an oven; of an air conveying chamber therein located adjacent the oven floor and having two opposed portions with slight spaces between the same and the oven floor and behind which chamber portions there are air conveying spaces in communication with the aforesaid spaces and through these spaces with the oven interior, one of these chamber portions receiving air from the exterior of the oven while the other chamber portion has an exit opening in communication with the upper portion of the space behind it and with the exterior of the oven by way of the space behind this chamber portion, the space between this chamber portion and the floor, the oven interior, the space between the other chamber portion and the floor, and the space behind this latter chamber portion and which latter space discharges air at its upper portion from the oven; means for effecting the forced circulation of air through said chamber from and to the exterior of the oven; and means for heating the circulating air.

5. The combination with an oven; of an air conveying chamber therein located adjacent the oven floor and having two opposed portions with slight spaces between the same and the oven floor and behind which chamber portions there are air conveying spaces in communication with the aforesaid spaces and through these spaces with the oven interior, one of these chamber portions receiving air from the exterior of the oven while the other chamber portion has an exit opening in communication with the exterior of the oven by way of the space behind this chamber portion, the space between this chamber portion and the floor, the oven interior, the space between the other chamber portion and the floor, and the space behind this latter chamber portion and which latter space discharges upon the exterior of the oven; means for effecting the forced circulation of air through said chamber from and to the exterior of the oven; and means for heating the circulating air, this heating means having portions behind the aforesaid air conveying chamber portions.

6. The combination with an oven; of an air conveying chamber therein located adjacent the oven floor and having two opposed portions with slight spaces between the same and the oven floor and behind which chamber portions there are air conveying spaces in communication with the aforesaid spaces and through these spaces with the oven interior, one of these chamber portions receiving air from the exterior of the oven while the other chamber portion has an exit opening in communication with the upper portion of the space behind it and with the exterior of the oven by way of the space behind this chamber portion, the space between this chamber portion and the floor, the oven interior, the space between the other chamber portion and the floor, and the space beyond this latter chamber portion and which latter space discharges upon the exterior of the oven; means for effecting the forced circulation of air through said chamber from and to the exterior of the oven; and means for heating the circulating air, this heating means having a portion behind the portion of the chamber having an exit opening.

7. The combination with an oven; of an air conveying chamber therein located adjacent the oven floor and having two opposed portions with slight spaces between the same and the oven floor and behind which chamber portions there are air conveying spaces in communication with the aforesaid spaces and through these spaces with the oven interior, one of these chamber portions receiving air from the exterior of the oven while the other chamber portion has an exit opening in communication with the exterior of the oven by way of the space behind this chamber portion, the space between this chamber portion and the floor, the oven interior, the space between the other chamber portion and the floor, and the space behind this latter chamber portion and which latter space discharges air at its upper portion from the oven; means for effecting the forced circulation of air through said chamber from and to the exterior of the oven; and means for heating the circulating air, this heating means having a portion behind the last mentioned air conveying chamber portion.

8. The combination with an oven; of an air conveying chamber therein located adjacent the oven floor and having two opposed portions with slight spaces between the same and the oven floor and behind which chamber portions there are air conveying spaces in communication with the aforesaid spaces and through these spaces with the oven interior, one of these chamber portions receiving air from the exterior of the oven while the other chamber portion has an exit opening in communication with the upper portion of the space behind it and with the exterior of the oven by way of the space behind this chamber portion, the space between this chamber portion and the floor, the oven interior, the space between the other chamber portion and the floor, and the space behind this latter chamber portion and which latter space discharges air at its upper portion from the oven; means for effecting the forced circulation of air through said chamber from and to the exterior of the oven; and means for heating the circulating air, this heating means having portions behind the aforesaid air conveying chamber portions.

9. The combination with an oven; of an air conveying chamber therein located adjacent the oven floor and having two opposed chamber portions, one receiving air from the exterior of the oven and the other having an outlet to the oven interior adjacent the oven floor, the air receiving chamber portion having a slight space between it and the oven floor and having an air conveying space behind it, this air conveying space discharging air at its upper portion from the oven; means for effecting the forced circulation of air through said chamber from and to the exterior of the oven; and means for heating the circulating air, this heating means having a portion located at the air receiving portion of the chamber and the space behind this chamber.

10. The combination with an oven; of an air conveying chamber therein located adjacent the oven floor and having two opposed chamber portions each with a slight space between it and the oven floor, one of these chamber portions receiving air from the exterior of the oven and the other having a space behind it into which it discharges and which space is in communication with the space beneath it and through this latter space with the oven interior, the space beneath the air receiving portion of the chamber being in communication with the exterior of the oven and also with the oven interior; means for effecting the forced circulation of air through said chamber from and to the exterior of the oven; and means for heating the circulating air, this heating means having a portion located in the space behind the air discharging portion of the chamber.

11. The combination with an oven; of an air conveying chamber therein located adjacent the oven floor and having two opposed chamber portions, one receiving air from the exterior of the oven and the other having an outlet to the oven interior adjacent the oven floor, the air receiving chamber portion having a slight space between it and the oven floor and having an air conveying space behind it, this air conveying space discharging air at its upper portion from the oven; means for effecting the forced circulation of air through said chamber from and to the exterior of the oven; and means for heating the circulating air.

12. The combination with an oven; of an air conveying chamber therein located adjacent the oven floor and having two opposed chamber portions each with a slight space between it and the oven floor, one of these chamber portions receiving air from the exterior of the oven and the other having a space behind it into which it discharges and which space is in communication with the space beneath it and through this latter space with the oven interior, the space beneath the air receiving portion of the chamber being in communication with the exterior of the oven and also with the oven interior; means for effecting the forced circulation of air through said chamber from and to the exterior of the oven; and means for heating the circulating air.

In witness whereof, I hereunto subscribe my name this 28th day of April A. D., 1916.

FRANKLIN F. BRADLEY.

Witnesses:
CHARLES D. MAYNARD,
EDWARD M. ROSENTHAL.